(12) United States Patent
Zhan

(10) Patent No.: US 8,324,874 B2
(45) Date of Patent: Dec. 4, 2012

(54) SYSTEM AND METHOD FOR CONTROLLING SYNCHRONOUS SWITCH FOR A SYNCHRONOUS CONVERTER

(75) Inventor: Xiaodong Zhan, Plano, TX (US)

(73) Assignee: Intersil Americas Inc., Milpitas, CA (US)

( * ) Notice: Subject to any disclaimer, the term of this patent is extended or adjusted under 35 U.S.C. 154(b) by 375 days.

(21) Appl. No.: 12/694,594

(22) Filed: Jan. 27, 2010

(65) Prior Publication Data

US 2010/0315059 A1 Dec. 16, 2010

Related U.S. Application Data

(60) Provisional application No. 61/186,029, filed on Jun. 11, 2009.

(51) Int. Cl.
*G05F 1/00* (2006.01)
(52) U.S. Cl. .................................................. 323/271
(58) Field of Classification Search .................. 323/271, 323/901
See application file for complete search history.

(56) References Cited

U.S. PATENT DOCUMENTS

| | | | | |
|---|---|---|---|---|
| 6,091,234 A | * | 7/2000 | Kitagawa | 323/244 |
| 6,191,964 B1 | | 2/2001 | Boylan et al. | |
| 7,045,992 B1 | * | 5/2006 | Silva et al. | 323/222 |
| 7,453,251 B1 | * | 11/2008 | Mehas et al. | 323/299 |
| 7,764,053 B2 | * | 7/2010 | Mehas et al. | 323/222 |
| 7,782,024 B2 | * | 8/2010 | Fukushi et al. | 323/224 |
| 7,839,130 B2 | * | 11/2010 | Shimizu | 323/282 |
| 2009/0001944 A1 | * | 1/2009 | Kim et al. | 323/238 |

* cited by examiner

*Primary Examiner* — Adolf Berhane
*Assistant Examiner* — Gary Nash
(74) *Attorney, Agent, or Firm* — Howison & Arnott, L.L.P.

(57) ABSTRACT

An apparatus comprises a synchronous converter for providing a regulated output voltage responsive to an input voltage, a control PWM signal to a control switch of the synchronous converter and a synchronous PWM signal to a synchronous switch of the synchronous converter. A first circuit generates the control PWM signal and the synchronous PWM signal responsive to a PWM control signal. The first circuit limits a maximum duty cycle of the synchronous PWM signal to a predetermined level.

14 Claims, 5 Drawing Sheets

SYSTEM AND METHOD FOR CONTROLLING SYNCHRONOUS SWITCH FOR A SYNCHRONOUS CONVERTER

CROSS-REFERENCE TO RELATED APPLICATIONS

This application claims the benefit of U.S. Provisional Application for Patent Ser. No. 61/186,029, filed on Jun. 11, 2009, entitled MAXIMUM DUTY CYCLE LIMITATION AND SOFT ENABLING OF THE SYNCHRONOUS FET IN A SYNCHRONOUS CONVERTER, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
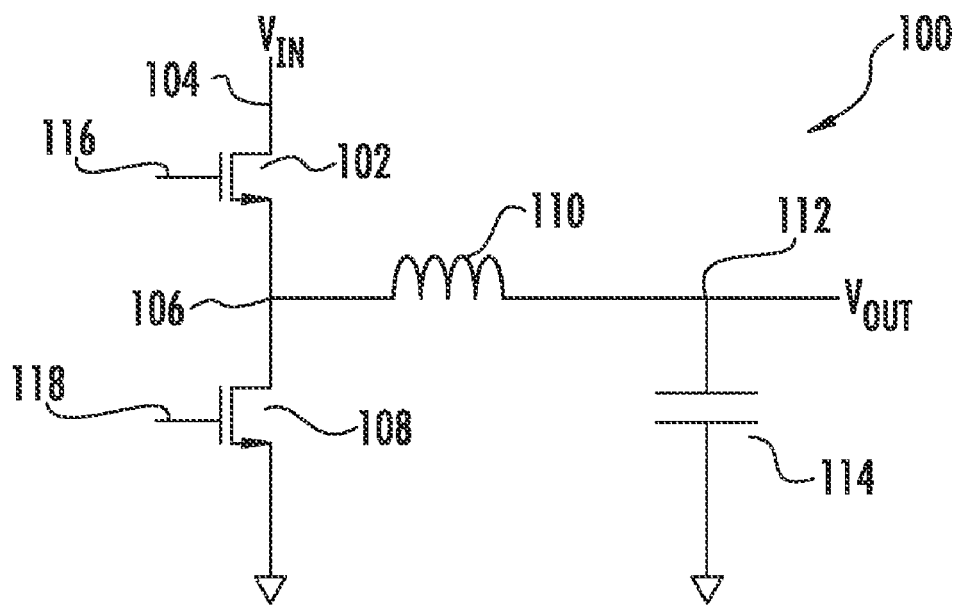
FIG. 1 is a schematic diagram of a synchronous buck converter.

Referring now to the drawings, wherein like reference numbers are used herein to designate like elements throughout, the various views and embodiments of a system and method for controlling synchronous switch for a synchronous converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated one example of a synchronous converter, namely a synchronous buck converter 100. The synchronous buck converter 100 includes a control switching transistor 102 having its drain/source path connected between the input voltage node $V_{IN}$ 104 and phase node 106. The gate of the control switching transistor 102 is connected to receive the PWM control signal. A synchronous switch 108 has its drain source path connected between node 106 and ground. The gate of synchronous switch 108 is connected to the synchronous PWM signal as will be described more fully hereinbelow. An inductor 110 is connected between the phase node 106 and the output voltage node $V_{OUT}$ 112. A capacitor 114 is connected between node 112 and ground. Node 116 receives the PWM control switch signal from the circuitry described hereinbelow. Node 118 receives the PWM synchronous control switch control signal from the circuitry described herein below.

Figure 2:
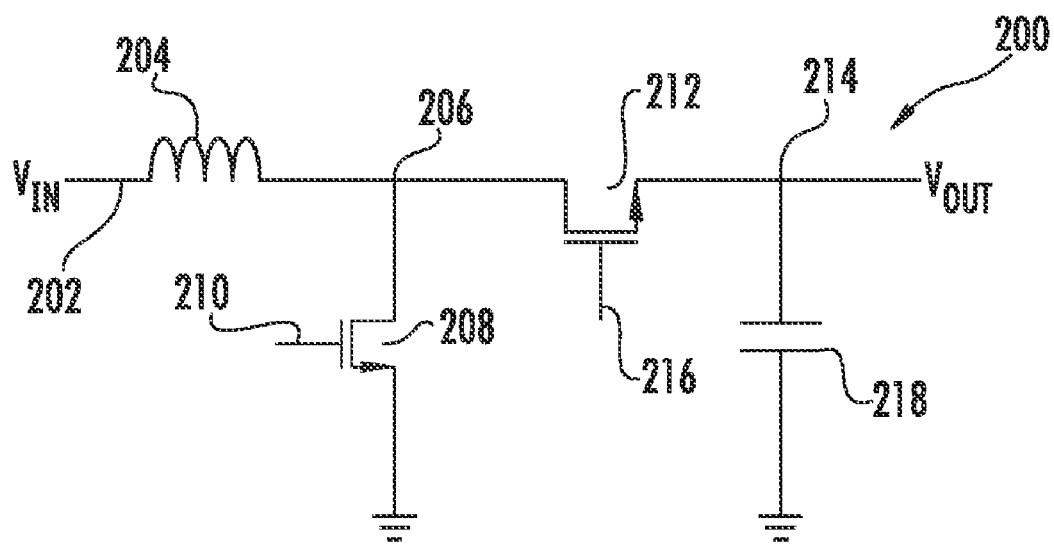
FIG. 2 is a schematic diagram of a synchronous boost converter.

Referring now to FIG. 2, there is illustrated another example of a synchronous converter, namely a synchronous boost converter 200. The synchronous boost converter 200 receives an input voltage $V_{IN}$ at node 202. An inductor 204 is connected between node 202 and the phase node 206. The control switch 208 is connected between node 206 and ground. The gate of control switch 208 is connected to receive the PWM signal for the control switch at node 210. Synchronous transistor switch 212 has its drain/source path connected between phase node 206 and the output voltage node 214. Node 216 at the gate of transistor switch 212 is connected to receive the PWM synchronous control switch control signal from the circuitry described herein below. A capacitor 218 is connected between node 214 and ground.

Within a synchronous converter such as those described with respect to FIGS. 1 and 2, the rectifier or free-wheeling diodes are substituted by the synchronous switching transistors 108 and 212 described hereinabove. When the PWM duty cycle of the control switch is D, the duty cycle of the synchronous switch is always 1-D. Thus, if the duty cycle D is zero or near zero, the synchronous switch will always be ON or running at a duty cycle close to 1. By limiting the maximum synchronous switch duty cycle to less than one, for example 0.96 or 0.98, there will be provided little effect on efficiency. Without limiting the maximum duty cycle, the maximum synchronous switch can be in an "on" state for a long period of time resulting in a large negative current in the inductor which will saturate the inductor and damage the synchronous switch. When the synchronous switch is run in a large or 1 duty cycle condition, the synchronous switch discharges the output capacitor and creates a high negative current in the output inductor (for synchronous buck and rectification) or from the output to the input (for synchronous boost). In applications having a large output capacitance or parallel operation, this high-negative current can damage the devices and make it difficult for the voltage converter to start or to fail to start altogether. Additionally for synchronous boost, a very high start-up current can trigger the input DC source current limit. While a buck synchronous converter and boost synchronous converter have been described hereinabove, the description herein is equally applicable to other types of synchronous converters and is not merely limited to the buck and boost configurations described hereinabove.

In order to safely to turn on and off a synchronous converter with its output pre-biased such as parallel operation, diode emulation during turning on and off is necessary. During turning on, the converter starts with diode mode and then transfers to synchronous mode. When a duty cycle of 1-D is suddenly applied to the synchronous switch, it discharges the output capacitor and pulls down the output voltage. The converter cannot meet monotonic start up requirements. High discharge currents can damage the synchronous switch.

In a synchronous rectification application with diode emulation during turning on and off, when turning off by disabling the control switches' PWM signal, the synchronous switches' duty cycle can be 1 if there is no maximum duty cycle limitation. High negative current can be generated in the output inductor. The high negative inductor current will avalanche break down the synchronous switches when they are turned off to enable the diode mode.

Figure 3:
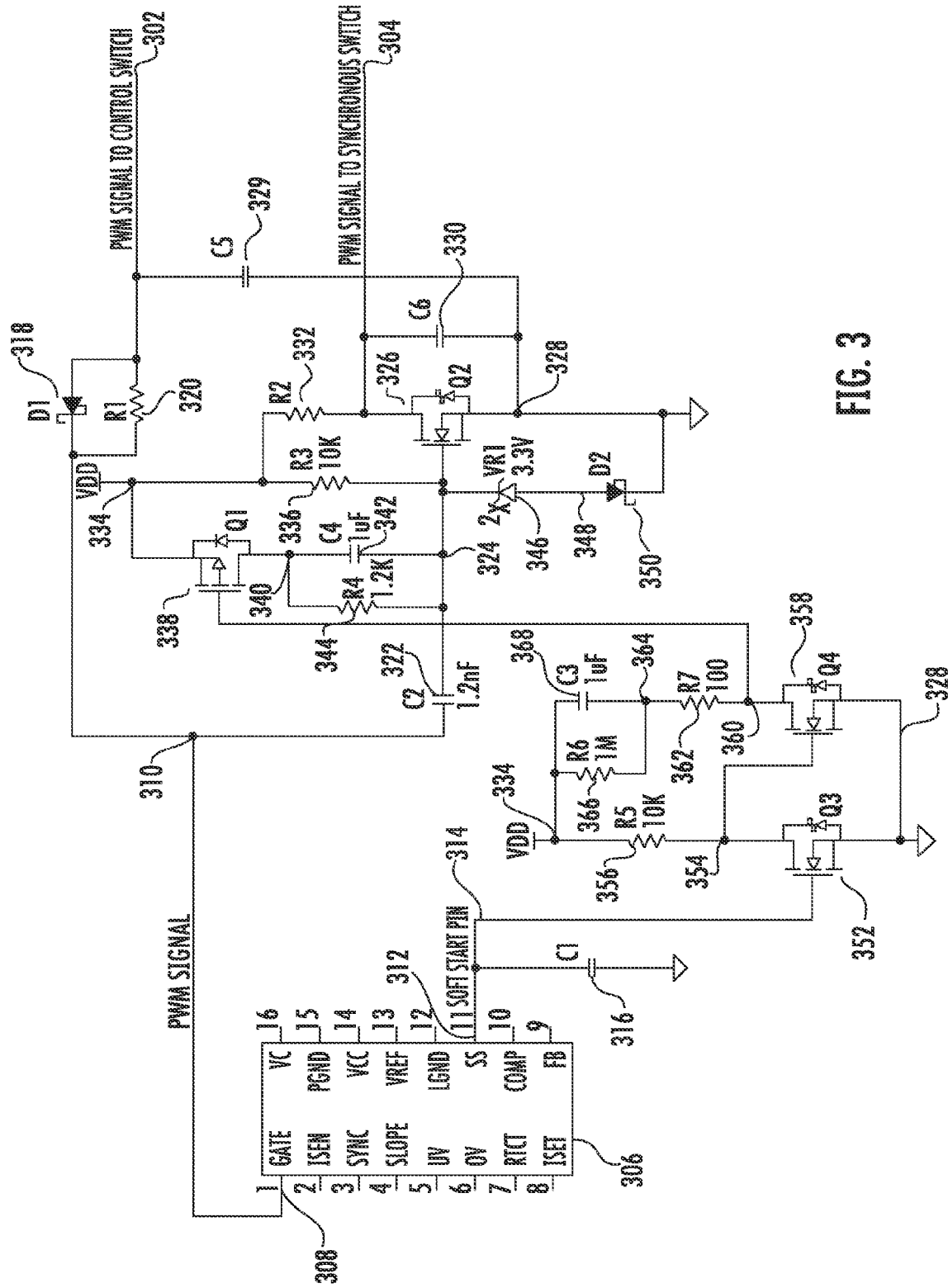
FIG. 3 is a schematic diagram of a circuit for providing maximum duty cycle limitations and soft enabling for a synchronous switch of a synchronous converter.

Referring FIG. 3, there is illustrated an embodiment of the circuitry that may be used to provide maximum duty cycle limitations and soft enabling of a synchronous switch within a synchronous converter. The circuit of FIG. 3 demonstrates the implementation of the idea in an application with a single PWM control signal generated by the single ended PWM controller 306. Usually, the synchronous switch PWM signal is derived by transistor 326 and a turn on delay caused by resistor 332 and capacitor 330. Resistor 320, diode 318, and capacitor 329 create the turn on delay for the control switch connected to node 302. The remainder of the circuitry provides the improvements discussed below.

The schematic diagram illustrates a circuit for providing the PWM signal to a control switch from node 302 and PWM signal to a synchronous switch from node 304. The PWM control signal and the soft start control signal are provided from a single ended PWM controller 306. In one embodiment, the single-ended PWM controller 306 may comprise the ISL 6721 controller manufactured by Intersil, Inc. The PWM control signal is provided from the gate pin 308 of the single-ended PWM controller 306 to node 310. The soft start control signal is provided from the soft start pin 312 to node 314. The gate pin 308 comprises the single-ended PWM controller device output and is a high current power driver capable of driving the gate of a power MOSFET. A soft start capacitor 316 is connected between node 314 and ground. The value of soft start capacitor 316 determines both the rate of increase of the duty cycle during start up and also controls the over-current shut down delay.

A diode 318 has its cathode connected to node 310 and its anode providing the output PWM signal to the control switch at node 302. A resistor 320 is in parallel with the diode 318 between node 310 and node 302. A capacitor 322 is connected between node 310 and node 324. Node 324 is connected to the gate of an N-channel transistor 326. The drain/source path of transistor 326 is connected between the node 304 providing a PWM signal to the synchronous switch and node 328. A capacitor 329 is connected between node 328 and node 302 providing the PWM signal to the control switch. A capacitor 330 is in parallel with transistor 326 between node 304 and node 328. A resistor 332 is connected between the $V_{DD}$ 334 and node 304. A resistor 336 is connected between the $V_{DD}$ 334 and node 324 connected to the gate of transistor 326.

A P-channel transistor 338 has its source/drain path connected between the $V_{DD}$ node 334 and node 340. Connected in parallel between node 340 and node 324 are a combination of capacitor 342 and resistor 344. A Zener diode 346 is connected between node 324 and node 348. A diode 350 has its anode connected to node 348 and its cathode connected to the ground node 328.

An N-channel transistor 352 has its gate connected to the soft start pin at node 314. The drain/source path of transistor 352 is connected between node 354 and the ground node 328. A resistor 356 is connected between the $V_{DD}$ node 334 and node 354. Node 354 is also connected to the gate of an N-channel transistor 358. The drain/source path of transistor 358 is connected between node 360 and the ground node 328. Node 360 is also connected to the gate of P-channel transistor 338. A resistor 362 is connected between node 360 and node 364. A resistor 366 is connected between the $V_{DD}$ node 334 and node 364. A capacitor 368 is in parallel with resistor 366 between node 334 and node 364.

The circuit of FIG. 3 generates the PWM signals to the control switch through node 302 and to the synchronous switch node 304 responsive to the PWM control signal provided by the single ended PWM controller 306. The described circuit resolves negative current issues that may arise during start up in a number of fashions. The circuit limits the maximum duty cycle of the synchronous switch connected to node 304. Additionally, the synchronous switch connected to node 304 is turned off during start-up such that the converter starts in a diode mode of operation. Finally, after the soft start process is completed, the synchronous switch connected to node 304 is softly enabled so that the converter can smoothly transfer from the diode mode of operation to the synchronous mode of operation without creating any high negative current surge and a negative output voltage drop. When referencing soft enabling of a synchronous switch, this means that the synchronous switch gate drive PWM duty cycle is increased from zero to its steady state value slowly to implement a smooth transition from the diode mode of operation to the synchronous mode of operation. The improvements are implemented in the following manner.

The limiting of the maximum duty cycle of the synchronous switch is performed by the transistor 326, capacitor 322, resistor 336, Zener diode 346 and diode 350. An AC coupling circuit consisting of capacitor 322, resistor 336, Zener diode 346 and diode 350 implements the synchronous switch maximum duty cycle ON time limitations. The AC coupling circuit couples the PWM signal provided at node 310 to the node 304 connected to the synchronous switch. When the PWM signal at node 310 is at a logical high level, this turns ON transistor 326. When transistor 326 is turned ON, node 304 is connected to the ground node 328 causing the PWM signal to the synchronous switch at node 304 to go to a logical low level. This causes the synchronous switch to be turned OFF. At the same time, capacitor 322 is charged up to a level equal to the PWM signal logical high level minus the breakdown voltage of zener diode 346 and the forward voltage of diode 350.

When the PWM signal at node 310 goes to a logical low level, the voltage at the gate of transistor 326 becomes negative and transistor 326 turns OFF. This connects the PWM synchronous switch signal at node 304 to the $V_{DD}$ node 334. The synchronous switch PWM signal at node 304 will return to a logical high level after a delay established by resistor 332 and capacitor 330. When the synchronous switch PWM signal at node 304 returns to a logical high level, this turns ON the associated synchronous switch. Capacitor 322 is discharged by resistor 336 until the gate voltage of transistor 326 reaches its turn ON threshold. This discharge time determines the ON time of the synchronous switch connected to node 304. By adjusting the values of the capacitor 322 and the resistor 336, the maximum ON time of the synchronous FET or the duty cycle can be adjusted. Zener diode 346 guarantees that the transistor 326 will turn ON and sets the charge voltage for capacitor 322. Diode 350 blocks capacitor 322 from having a discharge path to ground.

The synchronous FET is turned OFF during start up so that the converter will start in diode mode of operation in the following manner. Transistors 326, 338, 352 and 358 and their related circuitries implement the diode mode start up of the synchronous converter. These components also enable the synchronous switch soft start transition from the diode mode of operation to the synchronous mode of operation. Prior to the initiation of a soft start mode, the output voltage from the soft start pin 312 is at a logical low level. This logical low level causes transistor 352 to be turned OFF. This causes the gate of transistor 358 to be pulled high by the $V_{DD}$ voltage at node 334 and turns ON transistor 358. When transistor 358 is turned ON, node 360 connected to the P-channel transistor 338 goes to a logical low level causing transistor 338 to be turned ON. The gate of transistor 326 is AC coupled to the $V_{DD}$ voltage by capacitor 342 when transistor 338 is turned ON. Capacitor 342 is much larger than capacitor 322 such that the gate of transistor 326 may not be pulled to a logical low level by capacitor 322. With transistor 326 turned ON, the voltage at node 304 is at a logical low level, causing the synchronous switch to be disabled and run in the diode mode of operation. Capacitor 368 charges to $V_{DD}$ during this mode of operation.

When the soft start mode is initiated responsive to the output of the soft start pin 312 going to a logical high level, transistor 352 will be turned ON when the output from the soft start pin 312 provides a voltage level higher than the turn ON threshold of transistor 352. Responsive to transistor 352 being turned ON, the gate of transistor 358 is connected to the ground node 328 causing transistor 358 to turn OFF. Transistor 338 then has its gate connected to a higher voltage node 360. Transistor 338 will remain turned ON until the voltage on capacitor 368 discharges through resistor 366 to the turn OFF threshold of transistor 338. The discharge time of capacitor 368 must be longer than the soft start time to guarantee that the synchronous switch will remain in the diode mode of operation during soft start. When capacitor 368 gradually discharges through the turn OFF threshold of transistor 338, transistor 338 goes from the ON state to a linear range and finally to the OFF state. Capacitor 322 gradually takes control of the gate of transistor 326 as transistor 338 turns OFF and the turn OFF time of transistor 326 gradually increases from zero to its steady state value. At the same time, the synchronous duty cycle gradually increases from zero to its steady value. The turn OFF time of transistor 338 determines the transition time from the diode mode of operation to the synchronous mode of operation. Resistor 344 discharges capacitor 342 to prevent transistor 326 from turning OFF (synch FET turning ON) when $V_{DD}$ declines quickly.

Figure 4:
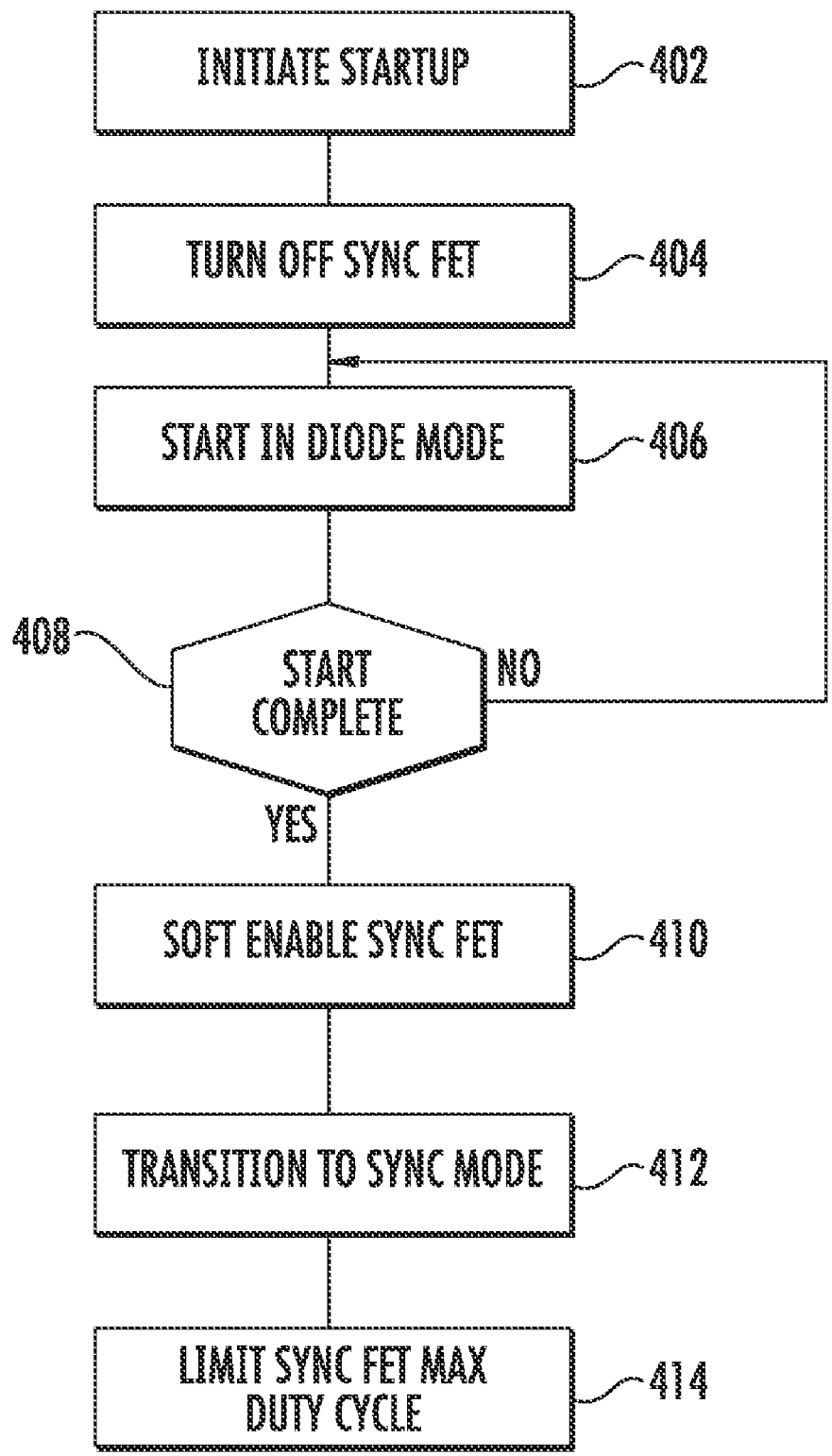
FIG. 4 is a flow diagram describing the operation of a synchronous converter utilizing the circuitry of FIG. 3.

Referring now to FIG. 4, there is provided a generalized flow diagram describing the manner for controlling the operation of a synchronous converter utilizing the circuitry of FIG. 3. A start up process is initiated at step 402. Responsive to the start up process, the synchronous switch transistor is turned OFF at step 404. Next, operation of the synchronous converter is started in the diode mode of operation at step 406. Inquiry step 408 determines if the start up mode has been completed for the converter. If not, control passes back to step 406. Once the start up procedure is completed, the synchronous switch is soft enabled at step 410. The synchronous FET slowly transitions from the diode mode of operation to the synchronous mode of operation at step 412. Once the transition to synchronous mode of operation is completed, the maximum duty cycle of the synchronous FET may be limited according to the described circuit at step 414.

Figure 5:
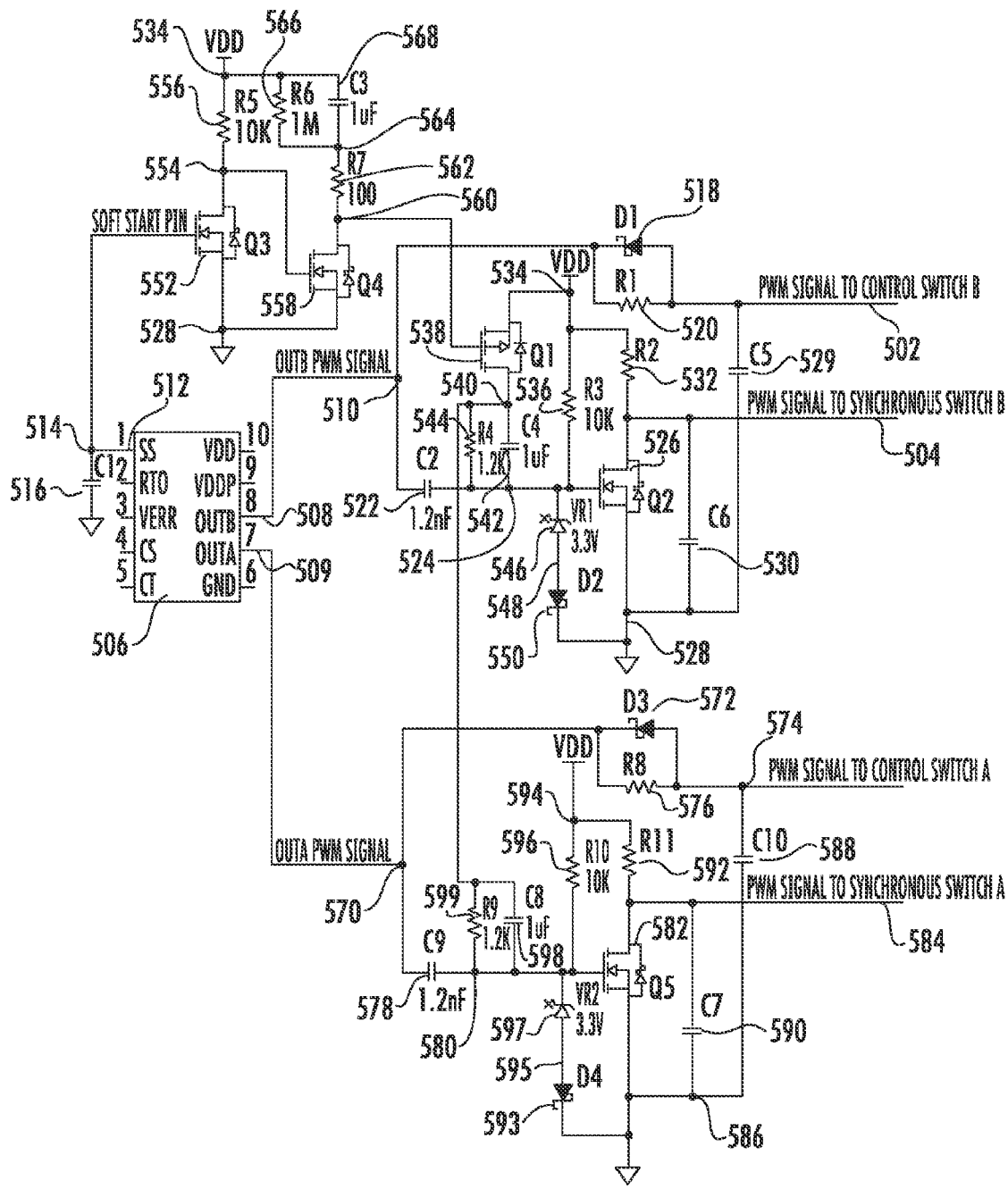
FIG. 5 is an alternative embodiment of the circuit of FIG. 3 of a double-ended synchronous PWM controller for synchronous rectification application.

Referring now to FIG. 5, there is illustrated an alternative embodiment of the circuit of FIG. 3 wherein a double ended synchronous PWM controller for synchronous rectification is illustrated and may be used to provide maximum duty cycle limitations and soft enabling of a synchronous switch within a double ended synchronous converter. The circuit of FIG. 5 demonstrates the implementation of the idea in an application with double ended PWM control signals generated by the double ended PWM controller 506. The synchronous switch PWM signals are derived by transistors 526 and 582 and a turn on delay caused by resistors 532, 592 and capacitors 530 and 590. Resistors 520, 576, diodes 518, 572 and capacitors 529, 588 create the turn on delay for the control switches connected to nodes 502 and 574.

The schematic diagram illustrates the circuit for providing PWM control signals to control switches from nodes 502 and 574 and PWM signals to synchronous switches from nodes 504 and 584. The PWM control signal and soft start control signal are provided from a double ended PWM controller 506. In one embodiment, the double ended PWM controller 506 may comprise the ISL6745A controller manufactured by Intersil, Inc. The OUT B PWM control signal is provided from the gate pin 508 of the double ended PWM controller 506 to node 510. The output A PWM signal is provided at node 570 from the gate pin 509 of the double ended PWM controller 506. A soft start capacitor 516 is connected between node 514 and ground. The value of the soft start capacitor 516 determines both the rate of increase of the duty cycle during start up and also controls the over current shut down delay.

A diode 518 has its cathode connected to node 510 and its anode providing the output PWM signal to the control switch at node 502. A resistor 520 is in parallel with the diode 518 between node 510 and node 502. A capacitor 522 is connected between node 510 and node 524. Node 524 is connected to the gate of an N-channel transistor 526. The drain/source path of transistor 526 is connected between the node 504 providing a PWM signal to the synchronous switch and node 528. A capacitor 529 is connected between node 528 and node 502 providing the PWM signal to the control switch. A capacitor 530 is in parallel with transistor 526 between node 504 and node 528. A resistor 532 is connected between the $V_{DD}$ 534 and node 504. A resistor 536 is connected between the $V_{DD}$ 534 and node 524 connected to the gate of transistor 526.

A P-channel transistor 538 has its source/drain path connected between the $V_{DD}$ node 534 and node 540. Connected in parallel between node 540 and node 524 are a combination of capacitor 542 and resistor 544. A Zener diode 546 is connected between node 524 and node 548. A diode 550 has its anode connected to node 548 and its cathode connected to the ground node 528.

An N-channel transistor 552 has its gate connected to the soft start pin at node 514. The drain/source path of transistor 552 is connected between node 554 and the ground node 528. A resistor 556 is connected between the $V_{DD}$ node 534 and node 554. Node 554 is also connected to the gate of an N-channel transistor 558. The drain/source path of transistor 558 is connected between node 560 and the ground node 528. Node 560 is also connected to the gate of P-channel transistor 538. A resistor 562 is connected between node 560 and node 564. A resistor 566 is connected between the $V_{DD}$ node 534 and node 564. A capacitor 568 is in parallel with resistor 566 between node 534 and node 564.

The circuit of FIG. 5 generates the PWM signals to the control switch through node 502 and to the synchronous switch node 504 responsive to the PWM control signal provided by the double ended PWM controller 508. The described circuit resolves negative current issues that may arise during start up in a number of fashions. The circuit limits the maximum duty cycle of the synchronous switch connected to node 504. Additionally, the synchronous switch connected to node 504 is turned off during start-up such that the converter starts in a diode mode of operation. Finally, after the soft start process is completed, the synchronous switch connected to node 504 is softly enabled so that the converter can smoothly transfer from the diode mode of operation to the synchronous mode of operation without creating any high negative current surge and a negative output voltage drop. When referencing soft enabling of a synchronous switch, this means that the synchronous switch gate drive PWM duty cycle is increased from zero to its steady state value slowly to implement a smooth transition from the diode mode of operation to the synchronous mode of operation. The improvements are implemented in the following manner.

The limiting of the maximum duty cycle of the synchronous switch is performed by the transistor 526, capacitor 522, resistor 536, Zener diode 546 and diode 550. An AC coupling circuit consisting of capacitor 522, resistor 536, Zener diode 546 and diode 550 implements the synchronous switch maximum ON time and thus duty cycle limitations. The AC coupling circuit couples the PWM signal provided at node 510 to the node 504 connected to the synchronous switch. When the PWM signal at node 510 is at a logical high level, this turns ON transistor 526. When transistor 526 is turned ON, node 504 is connected to the ground node 528 causing the PWM signal to the synchronous switch at node 504 to go to a logical low level. This causes the synchronous switch to be turned OFF. At the same time, capacitor 522 is charged up to a level equal to the PWM signal logical high level minus the breakdown voltage of zener diode 546 and the forward voltage of diode 550.

When the PWM signal at node 510 goes to a logical low level, the voltage at the gate of transistor 526 becomes negative and transistor 526 turns OFF. This connects the PWM synchronous switch signal at node 504 to the $V_{DD}$ node 534. The synchronous switch PWM signal at node 504 will return to a logical high level after a delay established by resistor 532 and capacitor 530. When the synchronous switch PWM signal at node 504 returns to a logical high level, this turns ON the associated synchronous switch. Capacitor 522 is discharged by resistor 536 until the gate voltage of transistor 526 reaches its turn ON threshold. This discharge time determines the maximum ON time of the synchronous switch connected to node 504. By adjusting the values of the capacitor 522 and the resistor 536, the maximum ON time of the synchronous FET or the maximum duty cycle can be adjusted. Zener diode 546 guarantees that the transistor 526 will turn ON and sets the charge voltage for capacitor 522. Diode 550 blocks capacitor 522 from having a discharge path to ground.

The synchronous FET is turned OFF during start up so that the converter will start in diode mode of operation in the following manner. Transistors 536, 552 and 558 and their related circuitries implement the diode mode start up of the synchronous converter. These components also enable the synchronous switch soft transition from the diode mode of operation to the synchronous mode of operation. Prior to the initiation of a soft start mode, the output voltage from the soft start pin 512 is at a logical low level. This logical low level causes transistor 552 to be turned OFF. This causes the gate of transistor 558 to be pulled high by the $V_{DD}$ voltage at node 534 and turns ON transistor 558. When transistor 558 is turned ON, node 560 connected to the P-channel transistor 538 goes to a logical low level causing transistor 538 to be turned ON. The gate of transistor 526 is AC coupled to the $V_{DD}$ voltage by capacitor 542 when transistor 538 is turned ON. Capacitor 542 is much larger than capacitor 522 such that the gate of transistor 526 may not be pulled to a logical low level by capacitor 522. With transistor 526 turned ON, the voltage at node 504 is at a logical low level, causing the synchronous switch to be disabled and run in the diode mode of operation. Capacitor 568 charges to $V_{DD}$ during this mode of operation.

When the soft start mode is initiated responsive to the output of the soft start pin 512 going to a logical high level, transistor 552 will be turned ON when the output from the soft start pin 512 provides a voltage level higher than the turn ON threshold of transistor 552. Responsive to transistor 552 being turned ON, the gate of transistor 558 is connected to the ground node 528 causing transistor 558 to turn OFF. Transistor 538 then has its gate connected to a higher voltage node 560. Transistor 538 will remain turned ON until the voltage on capacitor 568 discharges through resistor 566 to the turn OFF threshold of transistor 538. The discharge time of capacitor 568 must be longer than the soft start time to guarantee that the synchronous switch will remain in the diode mode of operation during soft start. When capacitor 568 gradually discharges through the turn OFF threshold of transistor 538, transistor 538 goes from the ON state to a linear range and finally to the OFF state. Capacitor 522 gradually takes control of the gate of transistor 526 as transistor 538 turns OFF and the turn OFF time of transistor 526 gradually increases from zero to its steady state value. At the same time, the synchronous duty cycle gradually increases from zero to its steady value. The turn OFF time of transistor 538 determines the transition time from the diode mode of operation to the synchronous mode of operation. Resistor 544 discharges capacitor 542 to prevent transistor 526 from turning OFF (synch FET turning ON) when $V_{DD}$ declines quickly.

A diode 572 has its cathode connected to node 570 and its anode providing the output PWM signal to the control switch at node 574. A resistor 576 is in parallel with the diode 572 between node 570 and node 574. A capacitor 578 is connected between node 570 and node 580. Node 580 is connected to the gate of an N-channel transistor 582. The drain/source path of transistor 582 is connected between the node 584 providing a PWM signal to the synchronous switch and node 586. A capacitor 588 is connected between node 586 and node 574 providing the PWM signal to the control switch. A capacitor 590 is in parallel with transistor 582 between node 584 and node 586. A resistor 592 is connected between the $V_{DD}$ 594 and node 584. A resistor 596 is connected between the $V_{DD}$ node 594 and node 580 connected to the gate of transistor 582. Connected in parallel between node 540 and node 580 are a combination of capacitor 598 and resistor 599. A Zener diode 597 is connected between node 580 and node 595. A diode 593 has its anode connected to node 595 and its cathode connected to the ground node 586. The circuit of FIG. 5 receiving the OUTA PWM signal operates in the same manner as the circuit receiving the OUTB PWM signal described above.

Figure 6:
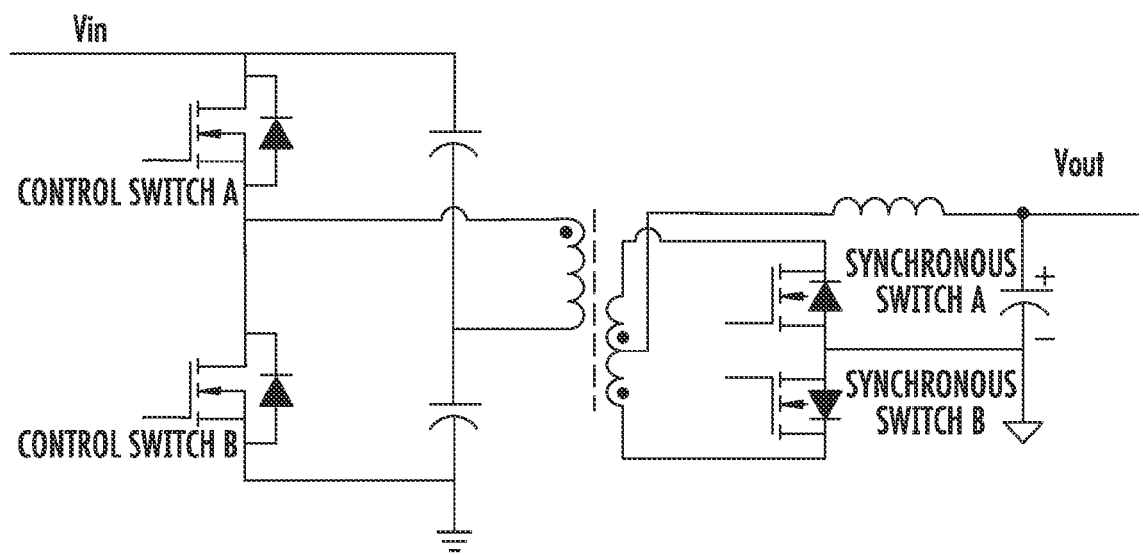
FIG. 6 is a schematic diagram of a half bridge synchronous rectification DC/DC converter.

Shown in FIG. 6 is a half bridge synchronous rectification DC/DC converter. It demonstrates a double ended synchronous rectification converter that the control circuit shown in FIG. 5 can control. The circuit shown in FIG. 5 can also control all other types of double ended synchronous converter such as full bridge and push-pull. Single ended synchronous rectification converters such as forward and flyback can be controlled by the circuit shown in FIG. 3.

Thus, using the above-described system and method of operation, the high negative inductor currents and high start up currents within the synchronous converters are substantially limited by limiting the maximum duty cycle of the synchronous switch, turning off the synchronous switch during start up so that the converter starts with a diode mode of operation and then softly enabling the synchronous switch after start up is completed to enable the converter to smoothly transition from the diode mode of operation to the synchronous mode of operation.

It will be appreciated by those skilled in the art having the benefit of this disclosure that this system and method for controlling synchronous switch for a synchronous converter provides a converter with improved operating characteristics. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus, comprising:
   a synchronous converter for providing a regulated output voltage responsive to an input voltage, a control PWM signal to a control switch of the synchronous converter and a synchronous PWM signal to a synchronous switch of the synchronous converter; and a first circuit for generating the control PWM signal and the synchronous PWM signal responsive to a PWM control signal, wherein the first circuit limits a maximum duty cycle of the synchronous PWM signal to a predetermined level, wherein the first circuit further comprises:
- a transistor for enabling provision of the synchronous PWM signal at a first logical level when the transistor is in an ON state and for enabling provision of the synchronous PWM signal at a second logical level when the transistor is in an OFF state;
- an AC coupling circuit for controlling the ON state and the OFF state of the transistor responsive to the PWM signal; and a second circuit for generating the synchronous PWM signal at a first logical level that turns off the synchronous switch of the synchronous converter during startup of the synchronous converter to maintain the synchronous converter in a diode mode of operation.

2. The apparatus of claim 1, wherein upon completion of the startup, the second circuit further controls the synchronous PWM signal to increase the synchronous PWM signal duty cycle from 0 to a steady state value to enable a transition for the diode mode of operation to a synchronous mode of operation responsive to a soft start signal.

3. The apparatus of claim 2, further including a single ended PWM controller for generating the PWM control signal and the soft start signal.

4. The apparatus of claim 2, wherein the second circuit further comprises:
- a first transistor for enabling provision of the synchronous PWM signal at a first logical level when the transistor is in an ON state and for enabling provision of the synchronous PWM signal at a second logical level when the transistor is in an OFF state;
- an AC coupling circuit for controlling the ON state and the OFF state of the first transistor responsive to the PWM signal; and
- a second transistor for maintaining the first transistor in the ON state when the second transistor is in an ON state responsive to the soft start signal and for providing control of the first transistor to the AC coupling circuit in an OFF state.

5. The apparatus of claim 1, wherein a discharge time of the AC coupling circuit controls a length of the ON state of the transistor.

6. The apparatus of claim 5, wherein the discharge time is controlled responsive to at least one capacitive value and one resistive value in the AC coupling circuit.

7. A circuit for controlling operation of a synchronous converter, comprising:
- a first input for receiving a PWM signal;
- a second input for receiving a soft start control signal;
- a first circuit for generating a control PWM signal and a synchronous PWM signal responsive to the PWM signal, wherein the first circuit limits a maximum duty cycle of the synchronous PWM signal to a predetermined level, wherein the first circuit further comprises:
  - a transistor for enabling provision of the synchronous PWM signal at a first logical level when the transistor is in an ON state and for enabling provision of the synchronous PWM signal at a second logical level when the transistor is in an OFF state; and
  - an AC coupling circuit for controlling the ON state and the OFF state of the transistor responsive to the PWM signal; and
- a second circuit for generating the synchronous PWM at a first logical level that turns off the synchronous switch of the synchronous converter during startup of the synchronous converter to maintain the synchronous converter in a diode mode of operation.

8. The circuit of claim 7, wherein upon completion of the startup the second circuit further controls the synchronous PWM signal to increase the synchronous PWM signal duty cycle from 0 to a steady state value to enable a transition for the diode mode of operation to a synchronous mode of operation responsive to a soft start signal.

9. The circuit of claim 8, wherein the second circuit further comprises:
- a first transistor for enabling provision of the synchronous PWM signal at a first logical level when the transistor is in an ON state and for enabling provision of the synchronous PWM signal at a second logical level when the transistor is in an OFF state;
- an AC coupling circuit for controlling the ON state and the OFF state of the transistor responsive to the PWM signal; and
- a second transistor for maintaining the first transistor in the ON state when the second transistor is in an ON state responsive to the soft start signal and for providing control of the first transistor to the AC coupling circuit in an OFF state.

10. The circuit of claim 7, further including a single ended PWM controller for generating the PWM signal and the soft start control signal.

11. The circuit of claim 7, wherein a discharge time of the AC coupling circuit controls a length of the ON state of the transistor.

12. The circuit of claim 11, wherein the discharge time is controlled responsive to at least one capacitive value and one resistive value in the AC coupling circuit.

13. A method for controlling startup of a synchronous converter, comprising the steps of:
- initiating start up of the synchronous converter;
- turning off a synchronous switch of the synchronous converter;
- starting the synchronous converter in a diode mode of operation;
- determining if a start up process of the synchronous converter is completed;
- transitioning the synchronous converter from the diode mode of operation to a synchronous mode of operation;
- providing a synchronous PWM signal at a first logic level responsive to an ON state of the synchronous switch in the synchronous mode of operation;
- providing the synchronous PWM signal at a second logic level responsive to an OFF state of the synchronous switch in the synchronous mode of operation;
- controlling the ON state and the OFF state of the synchronous switch in the synchronous mode of operation responsive to the synchronous PWM signal; and
- generating the synchronous PWM signal at a first logical level that turns off the synchronous switch of the synchronous converter during startup of the synchronous converter to maintain the synchronous converter in a diode mode of operation.

14. The method of claim 13 wherein the step of transitioning further comprises the step of increasing a duty cycle of the PWM switch from 0 to a steady state value over a predetermined period of time.

* * * * *